US007300913B2

(12) United States Patent
Nero

(10) Patent No.: US 7,300,913 B2
(45) Date of Patent: *Nov. 27, 2007

(54) SYSTEMS AND METHODS FOR CLEANING MATERIALS

(75) Inventor: Michael Duane Nero, Brentwood, CA (US)

(73) Assignee: Naturell Clean, Inc., Santa Clara, CA (US)

( * ) Notice: Subject to any disclaimer, the term of this patent is extended or adjusted under 35 U.S.C. 154(b) by 449 days.

This patent is subject to a terminal disclaimer.

(21) Appl. No.: 10/966,381

(22) Filed: Oct. 15, 2004

(65) Prior Publication Data

US 2006/0080785 A1 Apr. 20, 2006

(51) Int. Cl.
*C05F 11/00* (2006.01)
*A01N 25/00* (2006.01)

(52) U.S. Cl. ...................... 510/393; 510/392; 514/783; 504/116; 239/307

(58) Field of Classification Search ................ 510/392, 510/393; 514/783; 504/116; 239/307
See application file for complete search history.

(56) References Cited

U.S. PATENT DOCUMENTS

| | | | | |
|---|---|---|---|---|
| 4,069,538 | A | 1/1978 | Fallen | |
| 4,186,031 | A | 1/1980 | Armstrong et al. | |
| 4,998,314 | A | 3/1991 | Borofsky | |
| 5,733,355 | A | 3/1998 | Hibino et al. | |
| 6,223,380 | B1 | 5/2001 | Klima et al. | |
| 6,284,012 | B1 | 9/2001 | Mundschenk et al. | |
| 2003/0150936 | A1 * | 8/2003 | Bristor | 239/307 |

* cited by examiner

*Primary Examiner*—Douglas McGinty
*Assistant Examiner*—Preeti Kumar
(74) *Attorney, Agent, or Firm*—Tran & Associates

(57) ABSTRACT

Systems and methods for cleaning a material by applying a cleaning composition having biosurfactants and enzymes to said carpet; and bonnet cleaning the material.

14 Claims, 1 Drawing Sheet

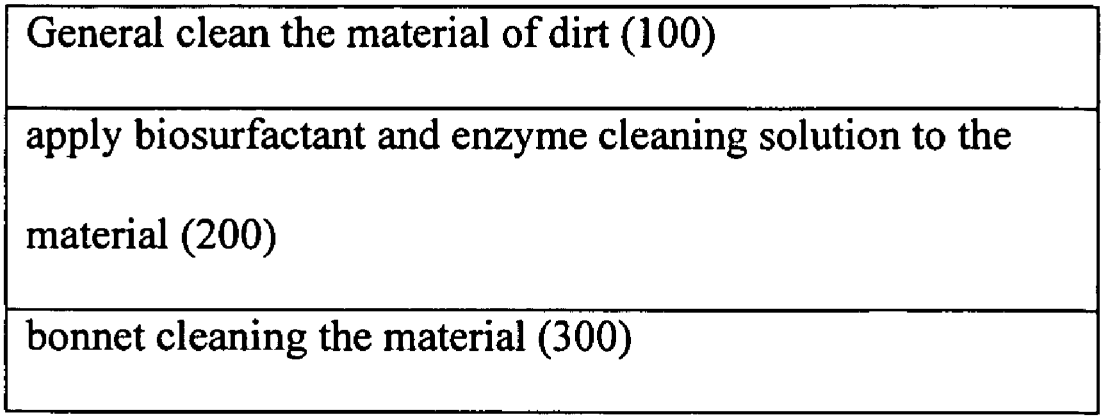

| |
|---|
| General clean the material of dirt (100) |
| apply biosurfactant and enzyme cleaning solution to the material (200) |
| bonnet cleaning the material (300) |

FIG. 1

SYSTEMS AND METHODS FOR CLEANING MATERIALS

BACKGROUND

The present invention relates to systems and methods for cleaning materials.

Materials such as carpets produced from synthetic or natural fibers and mixtures thereof are commonly used in residential and commercial applications as a floor covering. Various types of fibers can be used in making carpets such as polyamide and wool. However, carpets irrespective of whether they are made from natural or synthetic fibers are all prone to soiling and staining when contacted with many household items. Foods, grease, oils, beverages such as coffee, tea and soft drinks especially those containing acidic dyes can cause unsightly, often dark stains on carpets. Also fibers may become soiled as a result of dirt particles, clay, dust, particulate soils in general, coming into contact with, and adhering to the fibers of the carpet. These latter soils often appear in the form of a diffuse layer of soils rather than in the form of spots and tend to accumulate particularly in the so called "high traffic areas" such as near doors as a result of intensive use of the carpets in such areas.

Carpet cleaning and maintenance conventionally involves the application of a detergent solution to the carpet followed by extraction. Detergents, however, are alkaline and are often the cause of re-soiling. Detergents also work best at very high temperatures, this can cause carpet to delaminate. The job of a detergent is to release dirt's and oils from the carpet surface, they are able to do this because they contain surfactants (short for surface acting agents). Surfactants are molecules that are both Hydrophilic (water soluble) and Hydrophobic (water insoluble). These molecules have the ability to lower the surface tension of water and emulsify (saturate) the surface that is being cleaned. This causes the dirt and oils to release from the surface they are attached to. Dirt and oil is hydrophobic, when it is released into liquid it is naturally attracted to other hydrophobic particles. Surfactants are half hydrophobic so they attach themselves to the dirt and oil, they are also hydrophilic so they are able to keep the dirt and oil suspended in liquid.

Surfactants found in detergents are made of petroleum distillates, natural fats and oils, short synthetic polymers, or large synthetic alcohols. These surfactants require certain conditions in order to function efficiently, high temperature and a ph of 9 or greater. This puts them on the alkaline side of the ph scale. Solutions that are alkaline are sticky and slimy by nature, this is why it is necessary to rinse well after using detergents otherwise they will leave a sticky alkaline residue that will attract more dirt. This is a bit of a problem when it comes to carpet cleaning because carpet is absorbent by nature and difficult to rinse without using large amounts of water, and wet indoor carpet is a haven for the growth of mold, mildew, and bacteria.

Biosurfactants are a structurally diverse group of surface-active molecules synthesized by microorganisms. Biosurfactants are amphipathic molecules consisting of both hydrophobic and hydrophilic domains. Due to their amphipathic nature, biosurfactants can partition at the interfaces between different fluid phases such as oil/water or water/air interfaces. Unlike synthetic surfactants, biosurfactants are effective in hot or cold water, and at either extreme of the ph scale. Classifications of biosurfactants include: Glycolipids, Rhamnolipids, Trehalolipids, Sophorolipids, lipopepdides, and lipoproteins.

SUMMARY

Systems and methods for cleaning a material by applying a cleaning composition having biosurfactants and enzymes to said carpet; and bonnet cleaning the material.

An advantage of the present invention is that it is applicable to all carpet types, especially delicate natural fibers and is also safe to all carpet dye types, particularly sensitive natural dyes used therein. The cleaning solution is organic as it is derived Icelandic Sea kelp. The bio-surfactants are biodegradable and breaks down (decomposes) in nature. The solution is thus environmentally friendly. Stains and dirt are removed from carpets, leaving the finished carpet clean, dry and odor-free.

Because the cleaning system does not blasting the dirt loose with a high pressure spray, the system needs very little moisture, about 95% less than a steam cleaner uses. With small amounts of moisture absorption is more effective than suction. Each fiber of the carpet is wiped from the base to the top from all directions by a super absorbent mop pad under a floor buffer. Because the mop pad is more absorbent than the carpet, the moisture and any dirt that wasn't dissolved by the enzymes is easily transferred from the carpet to the mop pad. The cleaning solution and pad are also able to neutralize alkaline residues. Because the cleaning solution is not a detergent, it doesn't leave a sticky residue. The carpet feels softer and stays clean longer with the instant method. The method also uses very little moisture, so carpet is usually dry in about 30 minutes. By greatly reducing the drying time, mold, mildew, bacteria, and dust might's have less of a chance to grow back. The lipopeptides are also a natural antibiotic: microbes are more likely to grow on a surface that was cleaned with bleach than they are to grow on a surface that was cleaned with the instant cleaning solution because the antibiotic nature of or lipopeptides leaves behind conditions that are inhospitable to the growth of microbes.

The operation provides a great saving in time and labor, and is not injurious to the carpet pile. It is quiet, safe, and presents no inconvenience to the household. Another advantage of the present invention is that it may be applied directly on the carpet without causing damage to the carpet. In addition the cleaning action of the invention commences as soon as the carpet cleaning composition has been applied to the surface. Indeed, the use of the carpet cleaning composition prefers, but does not necessarily require, rubbing or/and brushing of the carpet. The carpet cleaning system extends useful carpet life and does not cause residue build-up. The resulting cleaned carpet is aesthetically appealing, wears well, and minimizes health problems arising from mold, mildew, bacteria, mites and other organisms that thrive in a dirty environment.

DESCRIPTION

FIG. 1 shows an exemplary process for cleaning a material such as clothing, fabrics, curtains or carpet. The process includes removing dirt from the material (100); applying a biosurfactant to the material (200) and then bonnet cleaning the material (300).

The cleaning solution includes one or more biosurfactants and enzymes. Instead of conventional synthetic surfactants that work best at high temperatures and at a ph of 9 or greater (alkaline), biosurfactants can work efficiently at hot or cold temperatures and at either extreme of the ph scale. In addition to this they are chemical free. Thus, the solution is non-alkaline, chemical free, and is better at cleaning then conventional detergents.

Two types of biosurfactants can be used: lipopeptides, for their ability to emulsify, and sophorolipids for their ability to attach to and suspend hydrophobic particles. While the biosurfactants are able to release the dirt's and oils from the fibers, the enzymes are able to dissolve it by trading atoms and changing molecules of dirt and oils into gasses and liquids.

Bonnet cleaning does not require that the carpet be overly wet. The agitation provided by the bonnet and buffer allows the system to clean deep down to the base of the fibers, and the bonnet is more than sufficient at absorbing the dirt and small amount of moisture out of the carpet.

During cleaning, the carpet, after being vacuumed, is sprayed with a fine mist of the biosurfactant and enzyme cleaning solution. The solution emulsifies the fibers, releasing the dirt, oils, and other unwanted items. The enzymes in the solution react upon many of these particles; others are suspended away from the fiber by the biosurfactants. Further agitation to aid the biosufactants is provided by the bonnet rotating in a circular motion under a floor buffer. The bonnet is made of nylon and polyester yarn looped through canvas in a sufficient amount to provide a surface that is much more absorbent than the carpet being cleaned. Liquid always takes the curse of least resistance, in the same way that water rolls down hill it also floes to the most absorbent surface. Because the dirt and oils are suspended in the liquid being absorbed by the bonnet, they are also absorbed out of the carpet. In order to assure that the bonnet does not become saturated and therefore unable to absorb, bonnets are changed frequently. Finally, a rake is applied to the carpet to stand the fibers and to remove any swirl patterns left by the bonnet. No rinsing is necessary because the solution does not contain anything undesirable that would need to be rinsed out such as chemicals or alkalinity.

In one embodiment using lipopeptides, Icelandic sea kelp is crushed, in much the same way grapes are crushed for wine, and strained. Icelandic sea kelp can be used because the waters around Iceland are much less polluted than other waters. This makes for a more healthy and higher quality kelp. The resulting organic medium is stored in a sealed sanitized container where it is introduced to *Bacillus Lichenformis* (a strain of bacteria commonly found in soil). The bacteria secrete enzymes that react with the medium to produce over time a biosurfactant that is capable of lowering the surface tension of water to 27 mN/m and interfacial tension between water and hexadecane to 0.36 mN/m. Each molecule contains seven amino acids and a lipid portion, which is composed of 8 or 9 methylene groups and a mixture of linear and branched tails. This biosurfactant, like most biosurfactants, also has antibiotic properties. After the process of making the biosurfactant is finished, the bacteria are removed using a centrifugal process. The solution is put into a centrifuge and spun around at 9,000 rpm for 15 minutes. This destroys all of the bacteria without damaging the solution.

Although Icelandic kelp or seaweed is preferred, other types of kelp or seaweed may be used including *Laminaria digitata, Laminaria saccharina, Laminaria cloustoni Edmondst, Fucus versiculosus, Ecklonia maxima, Durvillea antarctica, Pachymenia himantophora, Macrocystis integrifolia, Hypnea chordacea f. simpliciuscula, Hypnea charoides, Hypnea japonica, Hypnea cervicornia, Hypnea musciformis, Hypnea bryoids, Hypnea pannosa, Hypnea erecta, Hypnea specifera, Hypnea saidana*, and *Ascophyllum nodosum. Ascophyllum nodosum* seaweed, commonly known as Norwegian Kelp, Common wrack or Rockweed, a brown seaweed.

In one embodiment, a biosurfactant called lipopeptide is used. Lipopeptide, or lipoprotein, normally comprising more than several cyclically-structured amino-acids and a fatty acid combined at an end of their cycle, is a kind of surfactant with hydrophilic and hydrophobic components. The lipopeptides can lower the surface tension of water more than synthetic surfactants can. As an added bonus lipopeptide is also a natural antibiotic. Thus, microbes are more likely to grow on a surface cleaned with bleach than they are to grow on a surface cleaned with said solution because it leaves behind conditions that are inhospitable to the growth of microbes.

Another embodiment uses sophorolipids as biosurfactants. These biosurfactants are produced in much the same way as lipopeptides except *Candida* (a type of yeast) is used instead of the bacteria. They consist of a dimeric carbohydrate sophorose linked to a long-chain hydroxyl fatty acid. These biosurfactants are a mixture of at least 6 to 9 different hydrophobic sophorosides. This biosurfactant like most biosurfactants also has antibiotic properties.

In one embodiment, one strain of bacteria can be used to provide the lipopeptide. In another embodiment, the bacterial preparations can be a combination of more than several species or strains of lipopeptide-producing bacteria.

An enzyme is a protein or RNA which is capable of initiating a chemical reaction which involves the formation and/or breakage of chemical bonds. Enzymes are catalysts with very precise chemical definitions. They are able to substantially reduce the energy barrier which exists between atoms and prevents atoms from getting close enough to react and form a bond. Enzymes are able to catalyze chemical changes in other molecules, but the enzyme itself remains unchanged regardless of the number of times it reacts on other molecules.

The enzymes used in the cleaning solution are derived from sea kelp. Sea kelp is rich in enzymes. The enzymes present in the sea kelp are used in the cleaning solution.

Because of the particular nature of enzymes, they will not react unless they come in contact with the particular molecules they are specifically designed to react with. As the cleaning solution dries, the enzymes decompose without leaving a trace behind.

The solution is sprayed lightly over the area, in sufficient amount to moisten the carpet but not to soak or thoroughly wet the carpet through. Like ordinary dry cleaning, a carpet can be "spotted" before the general cleaning process, and the cleaning solution can be readily modified, as will be obvious to solve specific problems, such as pet or urine odors and stains, rust, blood, coffee stains, and the like.

The cleaning solution is applied to the carpet, preferably under a predetermined level of pressure. For instance, the cleaning solution could be used in connection with small hand-held rotary cleaning machines for spot cleaning or with other types of commercially available machines, such as a standard floor buffer machine.

In one embodiment for spot cleaning, the cleaning solution is bottled in a spray bottle and sprayed onto a carpeted area. A towel or a brush is applied to the sprayed region to apply pressure to the effected area. In another embodiment to clean a large area such as a whole room, the surfactant is sprayed using an industrial size sprayer. A power-driven implement facilitates scrubbing and cleaning of relatively large carpeted areas.

One suitable machine for such maintenance work is a rotary scrubbing machine. The rotary scrubbing machine has an electric motor, a handle extending at an angle upwardly toward the operator from a motor housing, a holding tank, which contains cleaning fluid, positioned on or above the motor housing and a scrubbing, polishing disk or base member attached to the motor drive shaft beneath the motor. The disk or base member includes a cleaning pad or bonnet disposed thereon. This bonnet bears directly on the floor or carpet and applies the cleaning fluid thereto. The combined rotational, lateral and forward movement of the bonnet performs the cleaning and scrubbing action.

In one embodiment, the rotary floor cleaning machine is of the slow speed, swing type having a standard one horsepower electric motor. Such a machine is capable of receiving bonnets having a fifteen to twenty-inch diameter. However, it is understood by those skilled in the art that the present invention is applicable to any type of rotary cleaning machine.

The bonnets can be a mop-like or shag-like consistency in that the surface which bears on the carpet is relatively soft and yielding. More recently, bonnets have been provided with firmer surfaces. These bonnets are made by tightly looping strands of strong synthetic material through a base sheet of material. The resulting bonnet is much like a hooked rug as its working surface is quite firm. The firmer surface is advantageous in that it actively cleans the carpet and loosens a considerable amount of dirt which is lodged deep in the carpet or rug. Other more recent bonnets have included generally radially disposed strips of fibers which are more like the consistency of conventional hair brushes. Still other bonnets combine the above features by providing a basically firm and fabricated-like hooked rug which includes radial strips of fibers and arcuate strips of fibers close to the circular edge of the bonnet. These fibers serve a scrubbing purpose and the firm, hooked-rug-like portion of the bonnet serves to further scrub the floor or carpet and, at the same time, serves to absorb and retain some of the dirt which is released from the floor or carpet. When a bonnet or pad becomes inefficient because it is loaded with soil particles and the like, it may of course be replaced with a clean, dry pad. The soiled pad may be washed for removal of contaminants, and reused.

While the present invention has been described in terms of a carpet cleaning solution and rotary scrubbing machines, one skilled in the art will realize that the structure and techniques of the present invention can be applied to many appliances. The present invention may be applied in any situation where cleaning is required.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed is:

1. A method of cleaning a carpet, comprising: applying an organic cleaning solution comprising: crushed sea kelp; adding *Bacillus Licheniformis* bacteria and yeast to the crushed sea kelp; applying the mixture of crushed sea kelp, *B. Licheniformis*, and yeast to a carpet to be cleaned; bonnet cleaning said carpet with bonnet and buffer; and raking said carpet.

2. The method according to claim 1, comprising vacuuming said carpet prior to applying said cleaning solution.

3. The method according to claim 1 wherein said cleaning solution is applied to said carpet, said carpet is bonnet cleaned.

4. The method according to claim 1 wherein said cleaning solution is used with a rotary floor cleaning machine.

5. The method according to claim 1 wherein said cleaning solution is applied to said carpet by a spraying device.

6. The method according to claim 1, wherein fibers of the carpet are wiped from the base to the top from all directions by a mop pad under a floor buffer.

7. The method according to claim 6, wherein moisture and dirt not dissolved by the enzymes are transferred from the carpet to the mop pad.

8. The method according to claim 6, wherein the cleaning solution and pad neutralize alkaline residues.

9. The method according to claim 6, wherein the cleaning solution is non-detergent and without a sticky residue.

10. The method according to claim 6, wherein cleaning solution in the carpet dries in about 30 minutes.

11. The method according to claim 10, wherein the cleaning solution comprises lipopeptides that are inhospitable to microbes.

12. The method according to claim 6, comprising applying *Bacillus Lichenformis* to crushed sea kelp for the production of lipopeptides.

13. The method according to claim 6, comprising producing the cleaning composition by crushing one of: *Laminaria digitata, Laminaria saccharina, Laminaria cloustoni Ldmondst, Fucus versiculosus, Ecklonia maxima, Durvillea antarctica, Pachymenia himantophora, Macrocystis integrifolia, Hypnea chordacea f. simpliciuscula, Hypnea charoides, Hypnea japonica, Hypnea cervicomia, Hypnea musciformis, Hypnea bryoids, Hypnea pannosa, Hypnea erecta, Hypnea specifera, Hypnea saidana*, and *Ascophyllum nodosum.*

14. The method according to claim 6, comprising applying one or more yeasts to crushed sea kelp for the production of sophorolipids.

* * * * *